United States Patent [19]

Thoma

[11] Patent Number: 5,226,979
[45] Date of Patent: Jul. 13, 1993

[54] APPARATUS INCLUDING A SHAPE MEMORY ACTUATING ELEMENT MADE FROM TUBING AND A MEANS OF HEATING

[75] Inventor: Paul E. Thoma, Cedarburg, Wis.

[73] Assignee: Johnson Service Company, Milwaukee, Wis.

[21] Appl. No.: 863,810

[22] Filed: Apr. 6, 1992

[51] Int. Cl.$^5$ .............................................. C22F 1/00
[52] U.S. Cl. ..................................... 148/402; 148/908
[58] Field of Search .................. 148/402, 908; 219/512

[56] References Cited

U.S. PATENT DOCUMENTS

| | | | |
|---|---|---|---|
| 4,412,872 | 11/1983 | Albrecht et al. | 148/402 |
| 4,518,444 | 5/1985 | Albrecht et al. | 148/402 |
| 4,565,589 | 6/1986 | Harrison | 148/402 |
| 4,881,981 | 11/1989 | Thoma et al. | 148/563 |
| 4,884,557 | 12/1989 | Takehana et al. | 148/402 |

FOREIGN PATENT DOCUMENTS

| | | | |
|---|---|---|---|
| 59-118862 | 7/1984 | Japan | 148/402 |
| 60-70153 | 4/1985 | Japan | 148/402 |
| 60-145385 | 7/1985 | Japan | 148/402 |

*Primary Examiner*—Deborah Yee
*Attorney, Agent, or Firm*—Foley & Lardner

[57] ABSTRACT

The present invention relates to hollow elements prepared from alloys having shape memory characteristics and techniques for heating the elements to effect the martensite (or R-phase) to austenite transformation. In its most preferred embodiment, the invention relates to the use of shape memory alloys to prepare hollow springs or tubular beams, bending and torsional, and the preferred methods of heating the elements include passing an insulated resistance heating wire through the core thereof and applying a current, or applying two layers of coating to the inside or outside of the tube, one of which is insulating and the other of which is electrically conductive. In the latter example, application of current to the conductive coating will heat the element. It is also envisioned that hot fluid may be passed through the element as the heating technique.

11 Claims, 1 Drawing Sheet

APPARATUS INCLUDING A SHAPE MEMORY ACTUATING ELEMENT MADE FROM TUBING AND A MEANS OF HEATING

TECHNICAL FIELD

The invention relates to the field of shape memory alloys (SMA), and more particularly to the forming of SMA into hollow elements, especially helical coils or torsion beams. The invention also relates to techniques for heating the elements to cause phase transitions and utilization of the shape memory properties of the alloys.

BACKGROUND OF THE INVENTION

1. Field of the Invention

An article made of an alloy having a shape memory can be deformed at a low temperature from its original configuration. On application of heat, the article reverts back to its original configuration. Thus, the article "remembers" its original shape.

Nickel-titanium alloys, for example, are known to possess shape memory characteristics, i.e., the alloys undergo a reversible transformation from an austenitic state to a martensitic state with a change in temperature. The transformation is often referred to as a thermal elastic martensitic transformation. The reversible transformation of the alloy between the austenitic and the martensitic phase occurs over two different temperature ranges which are characteristic of the specific alloy. As the alloy cools it reaches a temperature ($M_s$) at which the martensitic phase or R-phase starts to form, and finishes the transformation at a still lower temperature ($M_f$). On reheating, it reaches a temperature ($A_s$) at which austenite begins to reform and then a temperature ($A_f$) at which the change back to austenite is complete. In the martensitic state, the alloy can be easily deformed When sufficient heat is applied to the deformed alloy, it reverts back to the austenitic state and returns to its original configuration.

2. Description of the Prior Art

Many alloys have been described in the art as possessing shape memory characteristics. Several are disclosed in the background section of commonly-owned U.S. patent application Ser. No. 07/609,377, filed Nov. 5, 1990 in the name of David AbuJudom, et al. and entitled "High Transformation Temperature Shape Memory Alloy". That description is incorporated herein by this specific reference and will not be repeated as the particular shape memory alloys useful in the present invention are not, in and of themselves, critical to the undertaking of or the scope of the present invention.

A most preferred shape memory alloy is disclosed in commonly-owned U.S. patent application Ser. No. 07/863,206, filed Apr. 3, 1992 in the name of AbuJudom, et al., a continuation-in-part application of the aforementioned application. In the latter, copper is added to SMA alloys including nickel, titanium and hafnium (with zirconium either added or as an impurity). In the background section of the latter application, additional patents are described which include copper as a component of nickel-titanium SMA materials. Other copper base SMA are also known, such as copper-aluminum-nickel and copper-zinc-aluminum alloys.

Many methods of forming shape memory alloys are also known. For example, Thoma, et al., U.S. Pat. No. 4,881,981, issued Nov. 21, 1989, relates to a method of producing shape memory alloys. The method includes the steps of increasing the internal stress level, forming the member to a desired configuration, and heat treating the member at a selected emory imparting temperature. Other processing methods are taught in the patents disclosed in the aforementioned AbuJudom, et al. applications.

It is also known from the applications and patents referred to above that shape memory alloys may be used to form tubes. See, for example, Harrison, U.S. Pat. No. 4,565,589 issued Jan. 21, 1986, which indicates that such materials have found use as pipe couplings. In Albrecht, et al., U.S. Pat. No. 4,412,872, issued Nov. 1, 1983, wires formed of shape memory alloys are processed into coil springs, as illustrated in FIG. 8 of that patent. Albrecht, et al., U.S. Pat. No. 4,518,444, issued May 21, 1985 discloses that certain shape memory alloys may be formed in the configuration of "bars, tubes, profiles, wires, sheets or bands", with the patent focusing on the particular materials to be used in such applications.

While shape memory alloys, in and of themselves, are relatively well known, this technology is still maturing and researchers are still investigating various ways of capitalizing on the unique properties of such materials. Problems still to be addressed include the development of viable techniques for forming a particular article, the selection of alloys having transformation temperatures at desired temperature ranges and techniques for actually heating or cooling the elements during use to cause such transformations to occur.

The present invention addresses these problems and provides in illustrative embodiments helically coiled tubes or hollow torsion bars of shape memory alloy which can be used in various industrial applications and which are capable of being heated in a variety of ways heretofore not employed in the shape memory alloy field.

SUMMARY OF THE INVENTION

Hollow shape memory alloy elements are prepared in the form of helical coils or hollow, tubular beams, using extrusion, welding and drawing and/or winding techniques previously known for preparing such elements from ordinary alloys. The present invention also features techniques for heating the tubes to cause them to revert back to an original austenitic state from the deformed martensitic state.

The present invention features several heating techniques including passing an insulated resistance heating element through the tube and then passing current therethrough to heat the coil to cause transformation to the austenite phase to occur.

Also featured in the invention is a technique of passing a heated fluid through the coil to cause temperature elevation and a still further heating technique featured in the present invention is the application of a pair of coatings to the inner surface of the hollow member. The first applied coating layer is preferably an insulating material, over which is applied a layer of conductive material. Passing a current through the conductive layer, insulated from the SMA by the first layer, generates heat causing the desired phase transformation.

Another feature of the invention is to use hollow SMA elements for the reason that they cool more quickly, therefore decreasing the response time for the element.

How the features mentioned above are accomplished will be described in the following specification, taken in conjunction with the drawings. Generally, however, they are accomplished by using a hollow tube of SMA material which is beneficial from the standpoint of the techniques for heating the coil, and from the standpoint of reducing the amount of SMA material which is required for use in a particular application. A considerable quantity of expensive material is eliminated, as is the mass which is required to be heated to cause the member to undergo the phase transformation. Since the strength properties of coils and beams are typically concentrated at the outer surface of the members, rather than at their core, the benefits described above far outweigh any reduction in mechanical properties of the element.

Other ways in which the features and benefits of the present invention are accomplished will appear to those skilled in the art after the present specification has been read and understood. Such ways are deemed to fall within the scope of the present invention if they fall within the scope of the claims which follow.

DESCRIPTION OF THE DRAWINGS

In the various drawings, like reference numerals are used to indicate like components.

DETAILED DESCRIPTION OF THE PREFERRED EMBODIMENT

Before proceeding to the description of the illustrations which assist in describing the preferred and alternate embodiments of the present invention, several general comments need to be made about the applicability of the present invention.

First, the particular SMA alloy is not critical, and the alloy itself can be selected from any of those described in the background section of this application or other SMA alloys which are known or which are developed. As previously mentioned, two preferred SMA alloys for use in the types of applications which will be described later in this specification are those described in the AbuJudom et al. application and its continuation-in-part.

Second, the particular method in which the tubular element is formed in the present invention is not critical, and known techniques for extrusion, welding and drawing and/or winding, such as those that have been used previously to form solid helical springs, can be employed for the articles of the present invention. Such techniques are employed after the formation of the SMA alloy itself. In connection with the latter, reference is again made to the aforementioned AbuJudom application which describes melting techniques and forming techniques which have been found to be particularly useful for shape memory alloy elements. Such methods include, for example, the steps of vacuum arc melting the alloy components, followed by the steps of increasing the internal stress level, forming the member to the desired configuration and heat treating the member at a selected memory imparting temperature. Other processing techniques are described in other patents referenced in the aforementioned applications.

Third, while the invention will be described in connection with control elements, such as elements used in building environment control systems, that particular application is discussed solely for illustrative purposes and the springs, beams and torsional members forming the most preferred embodiments could be used in other SMA devices known to the art. These SMA elements are especially important as actuating members to open, close, position or move a member. In combination, using the preferred alloys referenced above, tubular springs, beams or torsional members are particularly desirable for applications where relatively high temperature transformation ranges are desired and where reliable and reproducible response is especially important. Examples of such applications are in fire detection, process monitoring and the like where the opening and closing of valves or dampers is necessary. Furthermore, in connection with the illustrated embodiments and other modifications which would appear to one skilled in the art, placing the springs, beams or torsional members, in line with various processing equipment, could detect pre-established temperature conditions.

Figure 1:
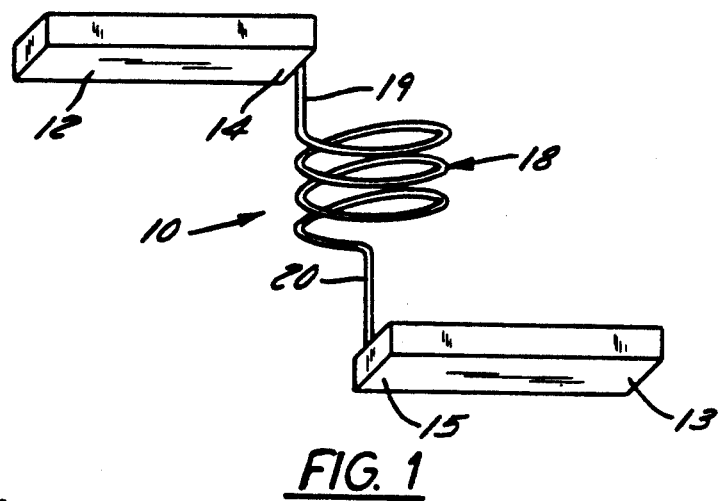
FIG. 1 is a schematic illustration of a coil spring made from SMA material used to couple two components and illustrating an end-use for an article of the present invention.

Referring first to FIG. 1, a schematic illustration is provided showing a control system 10 including a pair of elongate rods 12 and 13. One or both of rods 12 and 13 could be coupled to a switch, for example, and would be coupled thereto in such a manner that relative movement of an end 14 and 15 of the rods would achieve a desired movement at the other end (not shown). Ends 14 and 15 of rods 12-13 are coupled to opposite ends of a coiled spring 18, which in the present invention is formed from SMA material and is hollow. Other than the hollow nature of spring 18, a schematic such as FIG. 1 could represent a prior use of SMA materials.

It should also be assumed for purposes of this description that the spring 18 has been imparted with a desired shape while in its austenitic phase and that it is deformed to another and different shape, as in FIG. 1, in its martensitic shape. For example, the desired shape at a predetermined higher temperature could still be a coil shape but one having a greater or lesser distance between the ends 19 and 20 of the spring 18. The choice, of course, would depend on the other elements of the control system 10 and the nature of movement desired for rods 12-13 when the higher temperature would be reached.

Figure 2:
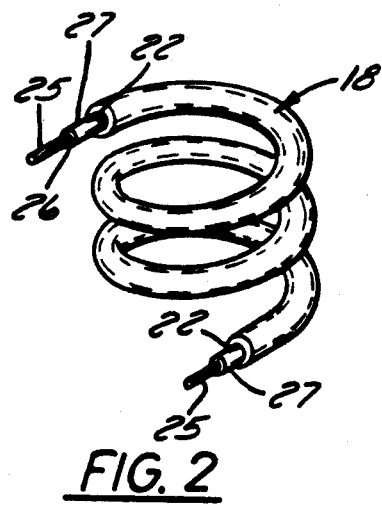
FIG. 2 is another schematic, a portion of which is in phantom, illustrating a preferred technique for heating the coil spring of FIG. 1.

Referring next to FIG. 2, a portion of spring 18 is shown, making it clear that spring 18 is hollow. I have found that since the load bearing areas of such springs are concentrated at the outer surface, expensive SMA material can be eliminated from the core 22 without substantially reducing the structural properties of spring 18 in either of its states.

FIG. 2 also shows that a wire 26 having a conductive inner element 25 and a surrounding insulating covering 27 is threaded through core 22 and that the ends of the covering 27 have been stripped from wire 26 to permit the ends or the conductive element 25 to be coupled to a source of electric current. FIG. 2 is the first of three drawings showing alternate embodiments of heating techniques. If current is passed through wire 26, heat will be generated within core 22, and if the alloy and amount of heat are properly selected, the deformed martensitic spring 18 will revert to its austenitic phase, and returns to its memory imparted shape after such heating occurs.

Figure 3:
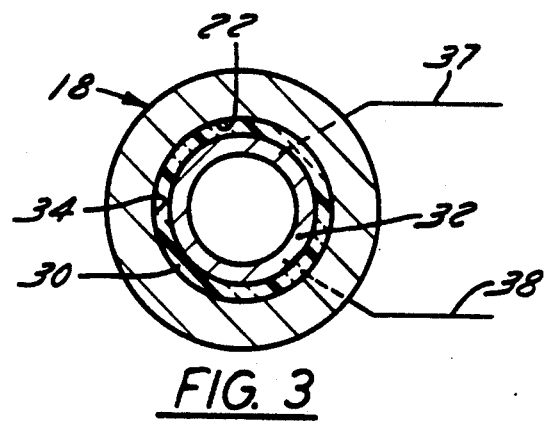
FIG. 3 is a sectional view through a portion of a coiled SMA tube showing the application of an insulating and an electrically conductive layer to the core of the tube, with schematic illustration of electrical leads passing to the conductive layer to cause heating of same.

In FIG. 3, another technique is employed for generating heat within core 22. In this embodiment, two layers 30 and 32 are applied to the inner surface 34 of the spring 18. The layer 30 applied directly to the spring 18 is an insulating layer, such as, for example, a coating of a resin which has a high resistivity to current flow and which bonds to the SMA alloy. Silicones, epoxies, polyurethanes, polysulfones, polycarbonates, polyimides and fluorinated polymers are examples of the types of materials which could be employed. The layer can be quite thin, e.g., 0.0001 inch.

The second layer 32 is a conductive layer which will generate heat when a current flows therethrough. It should be selected from those coatings which will bond securely to layer 30. Examples of materials which could be used for layer 32 include the same resins used for layer 30 filled with a conductive powder such as carbon, graphite or electrically conductive metal oxides, nitrides and carbides. Thickness is not critical for layer 32 either, and the core 22 could be filled with this material, although maintenance of a hollow opening throughout the spring element 18 is preferred.

In this FIGURE, a pair of leads 37 and 38 are schematically shown attached to spaced apart sections of layer 32 and the remote ends thereof (not shown) would be coupled to a power source for the generation of current between leads 37 and 38 and through layer 32. An alternate configuration for this heating technique is to place layer 30 on the outside of spring 18, with an overlying conductive layer 32. In either embodiment, a protective and insulating resin layer (not shown) could be added over the conductive layer 32.

Figure 4:
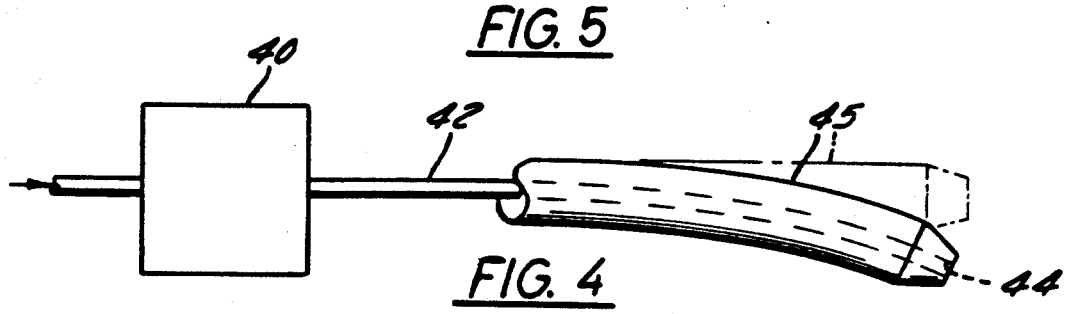
FIG. 4 is a schematic illustration of another heating technique in which a source of hot fluid is used to heat a hollow beam of SMA alloy, the derived "memory" shape being illustrated in dotted line.

FIG. 4 shows yet another method of heating spring 18, i.e., passing a heated fluid from a source 40 through a conduit 42 to an open end 44 of a hollow beam 45 representing (again in schematic form) an alternate embodiment to the spring 18. The fluid could be liquid or gas depending on the application, and the hollow beam 45 could be made from any of the SMA alloys mentioned previously. In practice, beam 45 would normally have been formed into a shape at an elevated temperature to impart a memory thereto and subsequently have been cooled to a lower temperature and formed into the shape shown in FIG. 4. Passage of a hot fluid through beam 45, at a temperature exceeding the austenitic phase transition temperature would cause the beam to revert to its original shape (in this case a straight beam illustrated in dotted line in the FIGURE).

Figure 5:
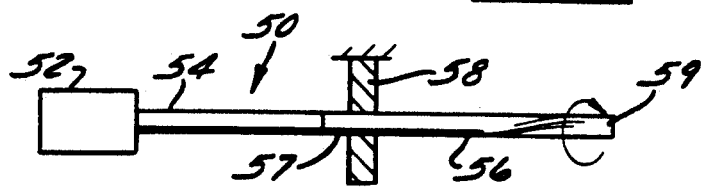
FIG. 5 is another schematic of a hollow tubular SMA alloy shown in torsion, again using fluid heating.

FIG. 5 is another schematic of a different system 50, including a fluid source 52, leading to a conduit 54, in turn coupled to a hollow tubular SMA element 56. The inlet end 57 of element 56 is secured to a fixed support 58, and the outer end 59 is shown schematically to be twisted about the axis of tube 56. Heating of tube 56 would cause rotation of end 59 and the desired actuation of a further element to which system 50 is coupled (not shown).

While only a few embodiments of the invention are illustrated and described in the specification, numerous others will readily be appreciated by those skilled in the art. Note that hollow elements of SMA material may be used for many applications at a substantial cost savings over prior systems and that they may be heated in a variety of ways, especially from the inside thereof, to provide temperature control and precision not heretofore fully realized in the art. It will also be readily appreciated that the external environmental temperature could be employed for self actuation of the hollow SMA elements. Accordingly, the invention is not to be limited by the foregoing description but only by the scope of the claims which follow.

What is claimed is:

1. An apparatus including a spring made from an alloy exhibiting shape memory characteristics, wherein the spring includes at least one hollow, tubular portion, the apparatus further including means for heating the spring from within the tubular portion.

2. The apparatus of claim 1, wherein the heating means comprises an insulated conductor within the tubular portion and means for passing current through the conductor.

3. The apparatus of claim 2, wherein the conductor is a wire.

4. The apparatus of claim 1, wherein the spring has first and second ends and at least one of said ends is coupled to an operative member.

5. The apparatus of claim 4, wherein the operative member is part of a building environmental control system.

6. The apparatus of claim 1, wherein the spring is an elongate beam.

7. The element of claim 6, wherein the beam is hollow throughout substantially all of its length.

8. An apparatus including a spring made from an alloy exhibiting shape memory characteristics, wherein the spring includes at least one hollow, tubular portion, the apparatus further including means for heating the spring comprising a first and second coating on the spring, the first coating being in contact with the spring and being electrically insulating and the second coating being on the exposed surface of the first coating and being electrically conductive, the heating means further including means for passing current through the second coating to generate heat.

9. An apparatus including a spring made from an alloy exhibiting shape memory characteristics, wherein the spring includes at least one hollow, tubular portion, the apparatus further including means for heating the spring by providing the hollow portion with and inlet and an outlet and means for coupling a source of fluid to the inlet.

10. The apparatus of claim 9 wherein the fluid is a liquid.

11. The apparatus of claim 9 wherein the fluid is a gas.

* * * * *